United States Patent Office 3,518,831
Patented July 7, 1970

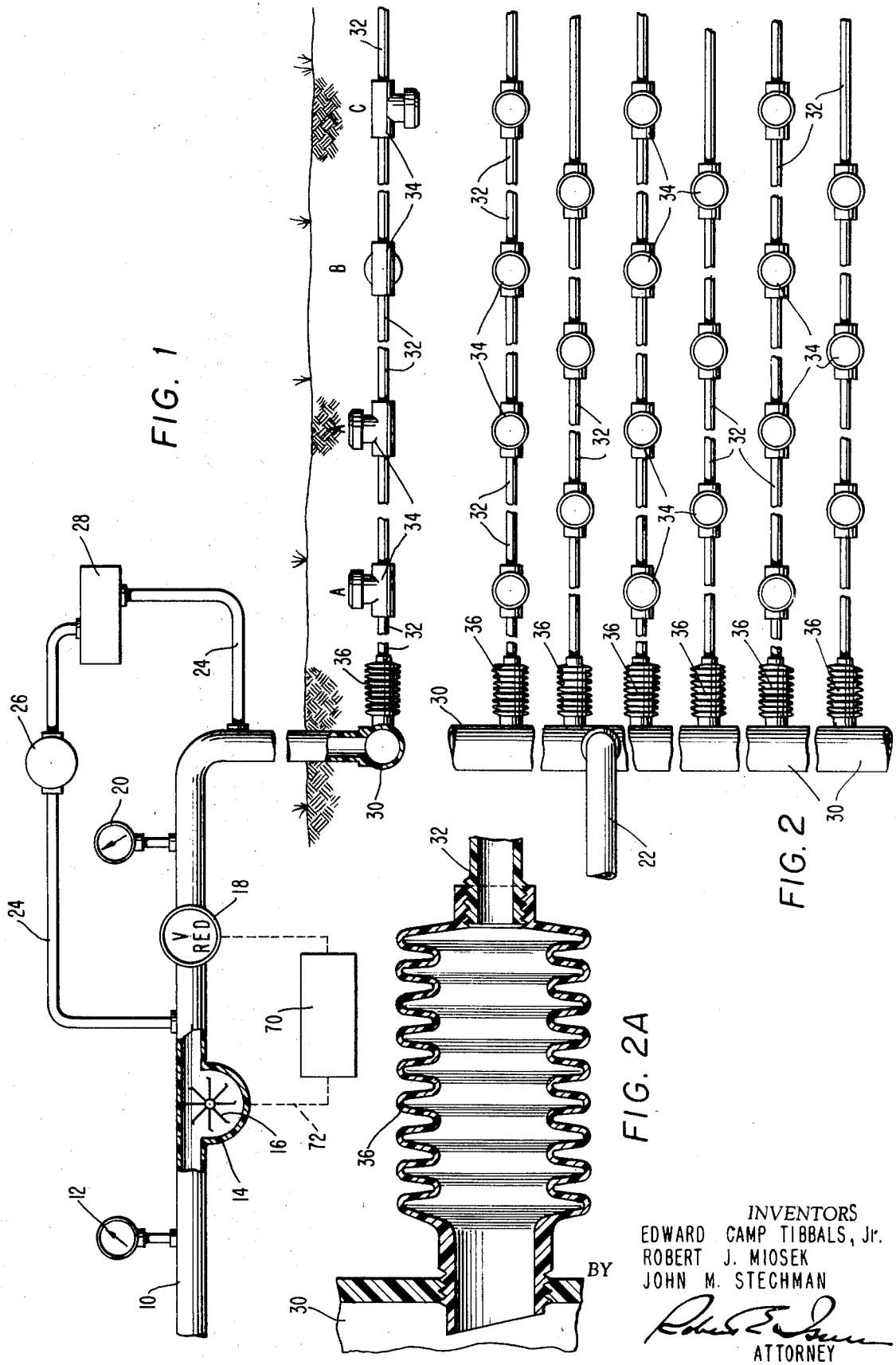

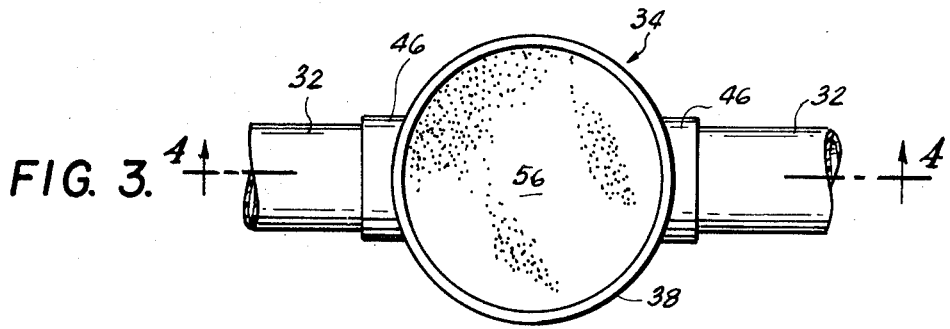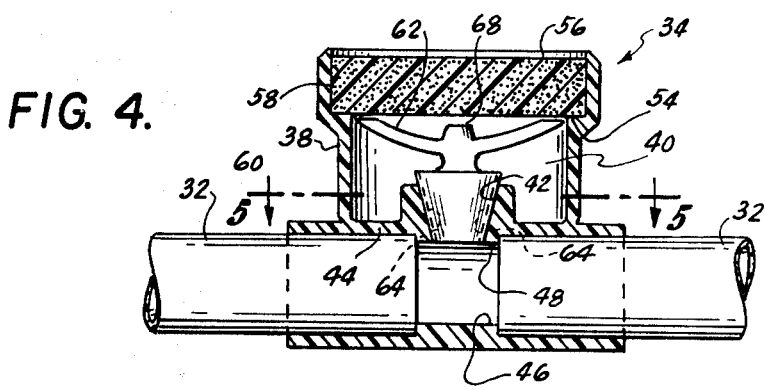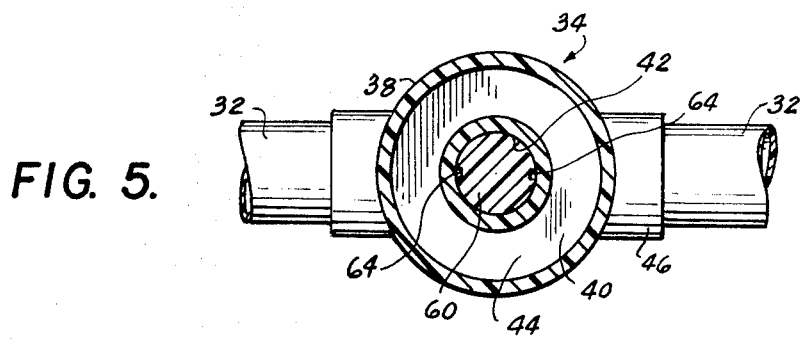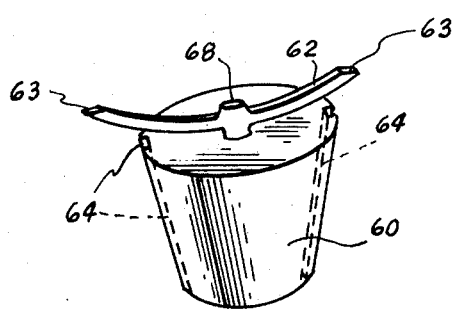

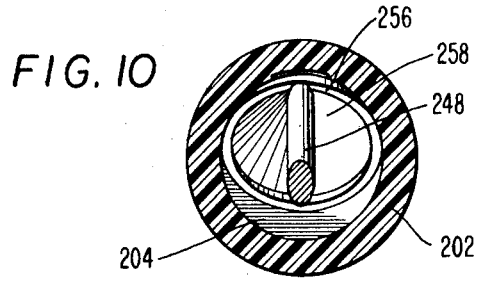
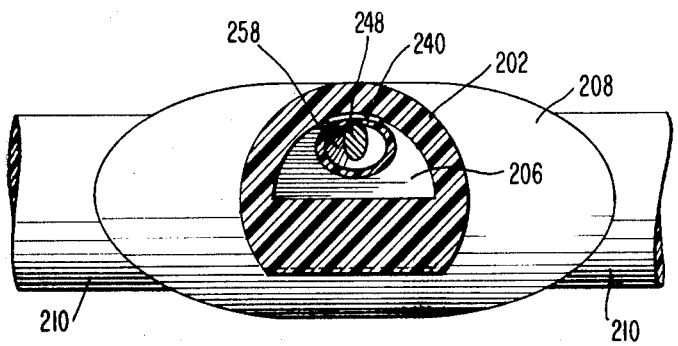
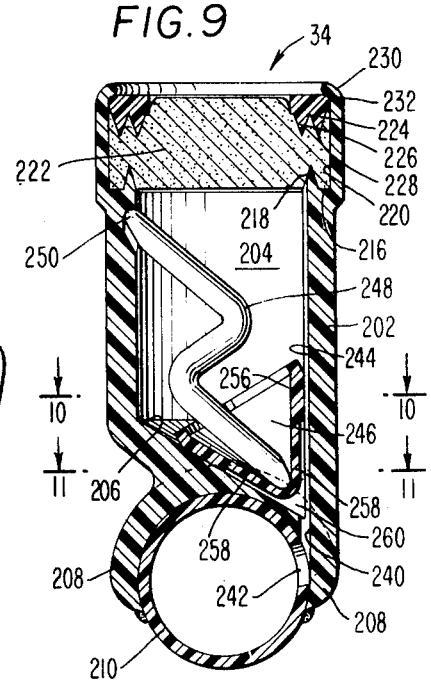
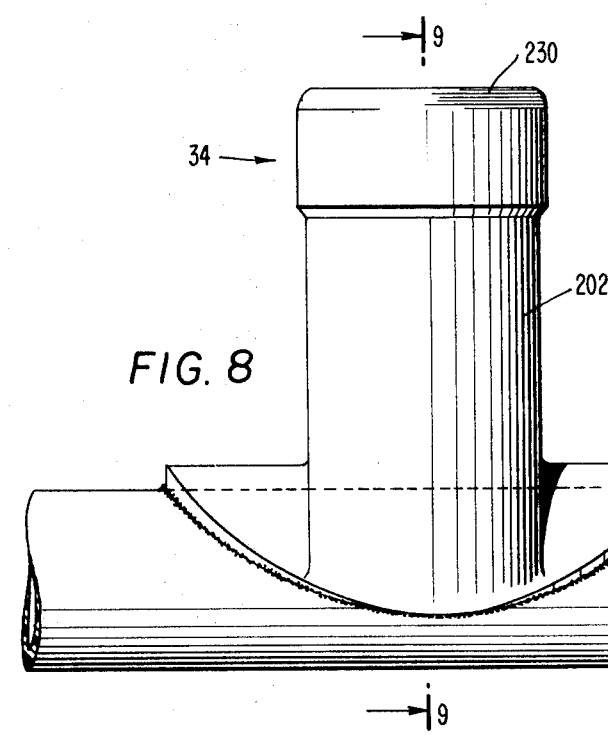

3,518,831
METHOD AND APPARATUS FOR SUBTERRANEAN IRRIGATION
Edward Camp Tibbals, Jr., and Robert J. Miosek, Boulder, and John M. Stechman, Jamestown, Colo., assignors, by mesne assignments, to Alexander Dawson, Inc., Mahwah, N.J., a corporation of Delaware
Continuation-in-part of application Ser. No. 575,608, Aug. 29, 1966. This application Nov. 2, 1967, Ser. No. 680,197
Int. Cl. E02b 13/00
U.S. Cl. 61—13                                    19 Claims

ABSTRACT OF THE DISCLOSURE

Subterranean irrigation system and improved fluid dispensing units therefor incorporating a movable valve member displaceable in accordance with variations in pressure of the irrigating fluid for metering the amount of irrigating fluid emitted therefrom and for disturbing sediment accumulated therein at preselected intervals.

---

This invention is a continuation-in-part of application Ser. No. 575,608, Method and Apparatus for Subterranean Irrigation, filed Aug. 29, 1966, now abandoned.

This invention relates to subterranean irrigation systems and particularly to an improved method and apparatus for effecting the controlled subsurface dispersing of liquids and of soil and plant conditioning additives includable therein.

The inherent potential advantages of the subterranean irrigation of land have long been recognized, and, as exemplified by the Timpe U.S. Pat. No. 3,046,747, so have the desirable operational characteristics of such subterranean irrigation systems to achieve optimum results. However, despite such long-standing knowledge and the proposing of many systems over the years in accelerated response to the increasing demand for foodstuffs by a rapidly expanding population and a decreasing supply of readily available water in many parts of the world, most, if not all, of the efforts to date to produce a practical and economically feasible operational subterranean irrigation system have not met with any measurable success.

Essentially, the basic operational requirements of an effective subterranean or subsurface irrigation system are antithetical in nature in that such must provide for the dispensing of relatively small quantities of the irrigating liquid from a myriad of locations at uniform and controlled rates over extended periods of time and to do so despite the differences in static head normally attendant topographical height variations in fluid friction in the conduits, together with the concurrent flow of sediment within the irrigating liquid and its inherent accumulation at a great number of locations within the system and the countercurrent growth and action of root hairs and the like both of which tend to clog the liquid emitting outlets of the system or otherwise deleteriously affect the desirable uniform and controlled rate of liquid dispensing. Satisfaction of such antithetical operational requirements is further compounded by overriding economic factors attendant the need for utilization of relatively closely spaced liquid dispensing units to effect the necessary uniformity of degree of liquid diffusion in the soil being irrigated. Such not only requires a myriad of fluid dispensing units for example, in the order of thousands per acre, as well as extensive lengths of interlinking conduit, but also requires that such units be essentially uniform in structure and in their operational characteristics over their effective operational life, and that such also be essentially inexpensive in nature and readily producible and assemblable in great quantities.

This invention may be briefly described as an improved subterranean irrigation system which includes fluid dispensing units of improved construction adapted to effectively continuously dispense irrigating liquid at selective uniform and controlled rates over extended periods of time in accordance with the needs of the soil being irrigated in conjunction with means for controlling the rate of liquid emission therefrom and for selectively displacing accumulated sediment or the like from critical flow controlling locations therein.

Among the advantages of the subject invention is the provision of a subterranean irrigation system that does not require extensive pre-filtering of the irrigating fluid and which is capable of being subjected periodically to sediment displacing action to thereby minimize, if not prevent, detrimental sediment accumulation therein; that readily permits accommodation of selected basic flow rates for all or part of a tract in accordance with the nature and requirements of the soil to be irrigated and with variations in the terrain at the locus of installation thereof; that affords a controllable range of variation in the selected basic flow rate in situ in accordance with the current needs of the soil being irrigated; that is readily formed of easily assemblable components with predetermined sizing and spacing in accordance with the needs of the locus of installation either preliminary to or at the time of installation; and that is made of simple and inexpensive, readily fabricatable components of reproducibly uniform character.

In addition to the above, the subject invention provides, as a practical reality, the heretofore well recognized but effectively unrealized general advantages of subterranean irrigation such as enhanced plant and root growth coupled with the highly efficient use of markedly less quantities of irrigating liquid, increased water vitalization efficiency, more uniform water distribution, and stimulation of deeper crop root growth.

One of the objects of this invention is the provision of improved constructions for subterranean irrigation systems.

Another object of this invention is the provision of improved constructions for fluid dispensing units for subterranean systems.

A further object of this invention is the provision of improved subterranean irrigation systems adapted to continually dispense irrigating liquid and soil and plant conditioning additives includable therein from a great number of outlets at selectively uniform and controllable rates for extended periods of time in accordance with the needs of the soil to be irrigated.

Still another object of this invention is to provide subterranean irrigation systems from which accumulated sediment is purgeable in situ and a method of effecting the same.

Still another object of this invention is the provision of subterranean irrigation systems that are readily assemblable of simple, inexpensive and readily fabricatable components of reproducibly uniform character.

Other objects and advantages of the invention will be pointed out in the following disclosure and will be apparent to those skilled in this art therefrom and from the appended drawings which illustrate, by way of example, a presently preferred subterranean irrigation system and components thereof that incorporate the principles of this invention.

Referring to the drawings:

FIG. 1 is a diagrammatic view of certain components of a subterranean irrigation system incorporating the principles of this invention;

FIG. 2 is a schematic plan view of a suggested subterranean irrigation system layout incorporating the principles of this invention;

FIG. 2A is an enlarged sectional view of a portion of FIG. 2 showing a preferred construction for interconnecting fluid conveying conduits to headers.

FIG. 3 is a plan view of a fluid dispensing unit incorporating the principles of this invention;

FIG. 4 is a vertical section taken on the line 4—4 of FIG. 3;

FIG. 5 is a horizontal section taken on the line 5—5 of FIG. 4;

FIG. 6 is an enlarged oblique view of the movable plug member; and

FIG. 8 is a side elevational view of an alternate construction for fluid dispensing units incorporating the principles of this invention.

FIG. 9 is a vertical section as taken on the line 9—9 of FIG. 8.

FIG. 10 is a horizontal section as taken on the line 10—10 of FIG. 9; and

FIG. 11 is a horizontal section as taken on the line 11—11 of FIG. 9.

Figure 7:
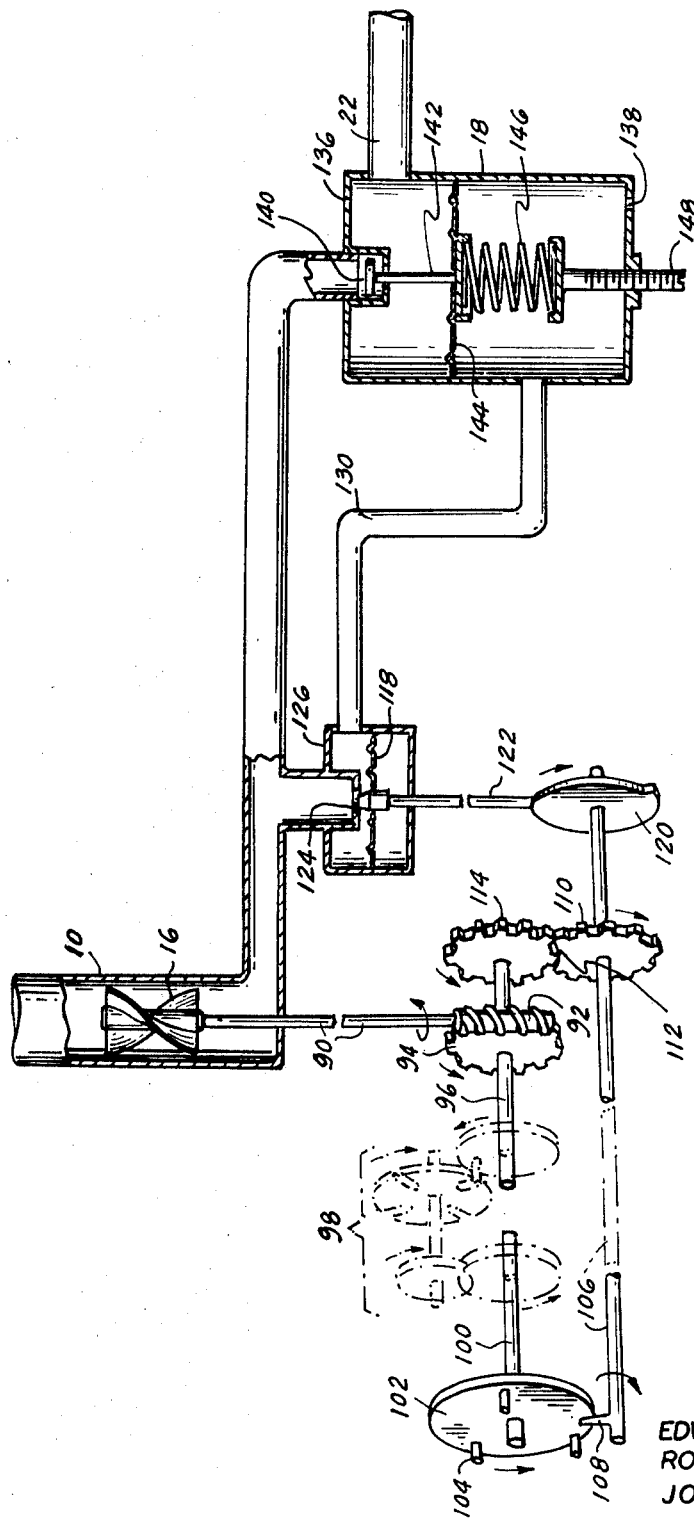
FIG. 7 is a schematic representation of the essentials of an automatic self-purging system incorporating the principles of this invention.

Referring to the drawings, the essentials of a subterranean irrigation system incorporating the principles of this invention is diagrammatically illustrated in FIG. 1 and includes a main conduit means, such as the pipe 10, connectable to a relatively high pressure source of irrigating fluid, as for example, water under a pressure of from about 12 to 20 pounds per square inch or higher as indicatable by a pressure gauge 12. Connected in the high pressure water line 10 is an integrating flow member 14 containing a rotatable element such as a paddle wheel or impulse turbine 16 adapted to be cumulatively rotatably displaced in proportional relation to the quantity of irrigating water flow through the pipe 10. Disposed downstream of the flow meter 14 is a pressure reducing valve assembly 18 adapted to selectively effect a reduction of the pressure of the irrigating liquid to a relatively low value as, for example, falling within the range of from about 2 to 10 pounds per square inch, as indicatable on the pressure gauge 20 connected into the low pressure conduit 22. A suitable pressure reducing valve is Model 11–009–0081 as manufactured by C. A. Norgren Co.

The nature of the irrigating water employed will of course be determined by what is available to the ultimate user thereof. Conventionally, however, such water can vary widely in its chemical and physical characteristics varying from high purity drinking water obtainable from wells or from municipal supply to relatively muddy and sediment loaded river water. Normally such waters as are employed for irrigation contain varying amounts of sand, silt and clay. In practice of the subject invention it will only be usually necessary to remove the larger sand particles from the water by prefiltering the same, since the hereinafter described systems have a relatively high tolerance for the normally much smaller silt and clay particles.

Connected with the high and low pressure conduits 10 and 22 across the pressure reducing valve assembly 18 is a bypass conduit 24 adapted, upon opening of the valve 26, to permit the passage of predetermined quantities of irrigating fluid to flow through suitable dispensing means 28 for adding controlled amounts of dissolved or dissolvable soil and/or plant conditioning additives thereto, such as fertilizer and trace elements, herbicides, fungicides, soil sterilants, organic matter, nematocides, growth inhibitors, growth stimulators and pH control materials, in accord with and in amounts dictated by the needs of the soil being irrigated.

The low pressure conduit 22 suitably terminates in one or more relatively large diameter low pressure headers 30, located either above or below ground level. To each of such headers 30 are connected a multiplicity of relatively small diameter fluid distributing conduits 32 each containing a multiplicity of spaced fluid dispensing units, generally designated 34, locatable a predetermned distance below the level of the ground. As schematically illustrated at 36 flexible interconnecting means are provided intermediate the headers 30 and the fluid distributing conduits 32. As will hereinafter become apparent, the fluid distributing conduits 32 and the fluid dispensing units 34 are of dimunitive size and the components of the latter are so constituted as to be easily and inexpensively formed by molding or the like in great quantity from suitable synthetic resins adapted to withstand the corrosive effects of particular soil and plant conditioning additives that may be specified for use and are of such character as to be readily assemblable and to afford a relatively long operating life in a subsurface environment. For example, the distributing conduit 32 suitably constitutes extruded flexible plastic tubing formed of polyethylene, polypropylene or polyvinyl chloride or the like and being of about .250 inch outside diameter and .210 inch inside diameter.

As best shown in FIGS. 2 through 6, a suitable construction for fluid dispensing units 34 advantageously utilizable in small scale installations or the like, such as for lawns, golf club tees and greens, hot houses and other relatively small areas, suitably comprises a generally T-shaped molded housing 38 selectively contoured to form an upwardly open cylindrical fluid reservoir chamber 40 connected, through a reduced diameter axially disposed and tapered plug receiving bore 42 in the base 44 thereof to an elongate transversely disposed cylindrical bore 46 having its terminal portions sized to serve as receiving sleeves for the fluid distributing conduit segments 32. As best shown in FIG. 4, the base 44 is shaped to provide a depending shoulder 48 surrounding the dependent end of the tapered bore 42 and which extends into the transverse bore 46 to limit the depth of insertion of the ends of the segments of the distributing conduit therein. Preferably the terminal sleeve portions of the bore 46 are slightly tapered to facilitate insertion of the conduit ends therein and permanent, watertight, interfacial interconnection therebetween is preferably effected by solvent welding although other securing techniques such as ultrasonic welding may be employed. The above described housing 38 is preferably unitarily formed of polyethylene, polypropylene or polyvinyl chloride by injection molding techniques.

The upper end of the chamber 40 is provided with an internally disposed shoulder 54 which peripherally supports a semi-rigid porous disc 56 in spaced relation with the base 44. The porous disc 56, which is peripherally firmly secured to the shoulder 54 and to the adjacent side wall portions of the chamber, as by bonding 58, is constituted to be of sufficient porosity as to readily permit the passage of multiples of the normal flow rate of water therethrough as well as to permit the ready passage of small slit clay particles therethrough under such increased flow rates. A suitable material comprises semi-rigid foamed plastic material as disclosed in the aforesaid Timpe Pat. No. 3,046,747. As indicated above, such material should be sufficiently porous to water flow as to readily pass both the normal flow rate for the system as well as the increased flow rates employed during the cleaning cycle and yet still effectively stop root hair growth and penetration therein.

Seated in the tapered plug receiving bore 42 is a displaceable complementally tapered plug element 60. The plug 60 is normally biased into firm seated engagement with the tapered bore 42 by an integral arcuately shaped spring member 62 having its terminal ends disposed in abutting compressive relationship with the underside of the disc 56 closely adjacent to the locus of the fused or bonded periphery thereof with the adjacent portions of the encircling wall of the housing 38.

The terminal ends of the spring members 62 are preferably tapered, as at 63, so as to minimize frictional resistance to their displacement. The degree of vertical displacement of the plugs 60 is limited by an integral centrally located boss 68. The degree of permitted displacement of the plugs 60 is relatively small, as for example, in the order of .010 inch or so.

The plugs 60 and integral spring 62 should be made of resilient spring-like material having low permanent set and high fatigue strength characteristics. Suitable units may be molded from polycarbonate resin, as for example, Lexan resin as manufactured by General Electric Co. or polyphenoloxide resins, as for example, Norell also manufactured by the General Electric Company.

As best shown in FIGS. 4–6, the side walls of the plug 60 are provided with one or more longitudinal metering grooves or channels 64 which serve, when the said plug 60 is seated in the tapered bore 42, as restricted passages for the continuous laminar flow of irrigating fluid from the fluid distributing conduit 32 and bore 46 into the chamber 40. Alternatively, such metering channels could be located in the wall of the tapered bore 42 in conjunction with a smooth-walled plug 60. As will now be apparent, the rate of fluid flow into the chamber 40 (and concomitantly out through the porous disc 56) will be primarily determined to be the total cross-sectional area of the metering channels 64 and the water pressure extant in the distributing conduits 32.

It is well recognized that a desirable subterranean irrigation technique is to introduce only sufficient water into the soil as to maintain a desired equilibrium condition over extended areas therein which not only eliminates localized muddy pockets but also minimizes the effects of various soil-water conductivities. That is, sufficient irrigating water should be added as to balance that lost by seepage and evaporation and by crop consumption so as to maintain a desired degree or level of soil saturation. To this end, the rate of water emission from each of the myriad of fluid dispensing units is maintained quite small and in no event should markedly exceed the capillary capacity of the surrounding soil to carry the same away. Such requirement effectively indicates the continuous emission of water at very slow rates from each dispensing unit. By way of illustrative example we have found that plugs 60 having two metering channels 64 of .001" depth x .060" width will provide a laminar flow rate of about 15 cc./min. at 5 p.s.i. operating pressure; that 2 channels of .001 x .040 will provide a laminar flow rate of about 10 cc./min. and that 2 channels of .001 x .020 will provide a laminar flow rate of about 5 cc./min. at such pressure.

FIGS. 8 through 11 illustrate an alternate construction for fluid dispensing units 34 that is again most advantageously utilizable in relatively small scale installations, such as for lawns, gardens, golf club tees and greens, hot houses, and other relatively small areas. This embodiment suitably comprises a generally cylindrically-shaped molded housing 202 dependently terminating in an arcuate saddlelike base portion 208 which is sized and shaped to be mounted in fluid tight relation on a fluid conveying conduit member 210. Such saddle shaped base portion markedly facilitates automated system assembly at the locus of installation and immediately prior to such installation.

The intermediate body portion of the cylindrical housing 202 is selectively contoured to form an upwardly open cylindrical water reservoir chamber 204 that dependently terminates in an angularly offset conically shaped bottom section 206. The upper end of the housing 202 is provided with an internally disposed shoulder 216 defining an enlarged bore 220 and which serves to peripherally support and retain a semi-rigid and preferably somewhat flexible porous disc 222 disposed therein. In order to firmly locate and retentively secure the disc 222, the shoulder 216 is provided with an upwardly directed peripheral locking ring portion 218 having a relatively sharp terminal edge. In an assembled unit, the locking ring 218 cooperates with an auxiliary locking ring member 224 to firmly secure and retain the porous disc 222 in desired position and facilitates assembly thereof. As shown, the auxiliary locking ring member 224 includes a pair of spaced and relatively sharp dependent edges 226, 228 together with a sharp outwardly projecting edge 232 over which the terminal end of the housing member 202 is deformed to form a locking head 230. The described sharp edged locking ring 224 in association with the upwardly directed locking ring portion 218 serves to compressively secure and retain the porous disc 222 in desired position but also functions to prevent deleterious root hair entry at the interface locations.

The porous disc 222, which serves as the fluid egress from the reservoir 204, can be of the same type and character as the porous disc 56 heretofore described in conjunction with the embodiment of FIGS. 3 through 6 and is desirably constituted to be somewhat flexible and of sufficient porosity as to readily permit the passage of multiples of the normal flow rate of water therethrough as well as to permit the ready passage of small silt and clay particles therethrough.

Disposed in fluid communication with the apex of the dependent conical terminus 206 of the water reservoir 204 is a fluid inlet passage 240 which is selectively dimensioned to limit the size of particulate matter that can pass therethrough. By way of example, a passage of about .012 inch in diameter will pass particles therethrough up to about .010 inch in maximum dimension. The lower end of the fluid inlet passage 240 is adapted to be disposed in communication with a relatively large aperture 242 introduced into the conduit wall and the upper end thereof merges with a semi-circular slot or channel 244 in the side wall of the housing 202 which may be sized to be of the same radius as that of the passageway 240.

Disposed within the bottom section 206 of the water reservoir 204 is a complementally shaped hollow plug element 246 formed of elastically deformable material and having its base portion 256 complementally sized to interfacially engage the adjacent wall surfaces in liquid tight relation. The apex portion 258 of the conical plug is of externally reduced thickness to prevent interfacial contact between such apex portion and the adjacent wall surfaces of the base 206 and such spacing results in the presence of a conically shaped annulus or recess 260 into which the fluid inlet passage 240 delivers fluid. Such recess 260 is in continual fluid communication with the interior of the reservoir 204 via the channel 244 whose area will determine the effective rate of fluid admission for any given operating pressure.

The conical plug element 246 is normally biased in sealing relationship within the conical base 206 of the reservoir 204 by a generally S shaped biasing spring 248 having one end disposed within and at the apex of the plug 246 and the other end thereof disposed within a suitably located positioning recess 250 of the side wall of the housing to provide for bias force application along the longitudinal axis of the plug member. The spring member 248 is desirably of symmetrical configuration to both facilitate assembly of the unit and also to readily and uniformly provide the desired degree of preload in assembled units.

The above described constructions for fluid dispensing units permit easy preselection of a desired flow rate range for all or parts of a selected tract by selective pre-dimensioning of the metering channels 64 and 244. Moreover, once so selected, the actual flow rate can be varied, within a limited, though effective, operating range, in accordance with variations introduced in the operating pressure in the system. The illustrated construction thus inherently provides a ready capability, for any given installation, for preselecting a desired optimum flow rate and then accommodating limited variations therein in accordance with outside factors, such as the season of the year or differences in crops, by mere variation in the operating pressure.

FIG. 2 schematically illustrates a suggested pattern or arrangement of water distribution conduits 32 and fluid dispensing units 34 of the types described above for effecting the subterranean irrigation of a given tract of land. As there illustrated, a plurality of discrete distributing conduits 32 are terminally connected, by flexible interconnecting means 36, to a low pressure header 30 and extend therefrom beneath the surface of the ground in essentially parallel spaced relation with the spacing therebetween being determined, at least in part, by the nature of the soil and the desired amount of water to be introduced therein as well as by the type of crop to be grown thereon. Included in series spaced relation in each of the distributing conduits 32 are multiplicities of fluid dispensing units 34. As illustrated in FIG. 1, such fluid dispensing units are preferably arranged in upright position relative to the ground surface as illustrated at (A), but will function in a satisfactory manner when disposed in skewed or even inverted position, as illustrated at (B) and (C). The spacing of the individual fluid dispensing units 34 in a distributing conduit will again be determined, at least in part by the nature of the soil, the desired amount of water to be introduced therein and the nature of the crop to be grown. As illustrated, a staggered or offset arrangement of fluid dispensing units 34 can readily be employed to facilitate the obtaining of more uniform gradients of soil saturation for a given set of conditions.

As best shown in FIG. 2A, a preferred form of flexible interconnection means 36 comprises a section of convoluted flexible hose having an effective diameter markedly larger than the diameter of the conduits 32 and being of sufficient length to accommodate settling or other unintended physical displacement of the conduits 32 and header 30. The oversize diameter will effectively minimize fluid flow rates therethrough and such, in conjunction with the recessed areas formed intermediate the pleated hose crests, will serve to accommodate settling of sediment preliminary to introduction of irrigating fluid into the conduits 32.

By way of specific example, the fluid dispensing conduits 32 can be spaced anywhere from 2 to 6 or more feet apart and the fluid dispensing units 34 can be spaced, in each conduit, in a like manner. Illustratively, a 4-foot transverse spacing of conduits 32 and a similar 4-foot spacing of fluid dispensing units 34, will require for each acre of ground, about 2700 fluid dispensing units buried therein as well as about two miles of conduit 32. As pointed out earlier, the subject construction permits the preselection of fluid dispensing units 34 in accordance with a predetermined desired flow rate as well as permitting the mixing of different flow rate categories and/or types of fluid dispensing units in accordance with the terrain or particular needs of the tract being irrigated. In the example set forth above utilization of fluid dispensing units 34 having a 10 cc./min. flow rate will result, neglecting cleaning cycle effects which, of course, must be accounted for in any operable system, in the consumption of about 7 gallons of irrigating fluid per minute per acre.

When arranged as illustrated in FIG. 2, the presence of low pressure irrigating fluid within the system will result in the passage, under essentially laminar flow conditions, of a predetermined quantity of such fluid per unit time through each of the flow rate determining passages or channels and in the filling of the fluid reservoir chambers in each of the fluid dispensing units 34. The continuance of such flow rate under the preset operating pressure differential will result in the continual passage of desired amounts of the irrigating fluid through the porous discs and into the soil. As will now be apparent to those skilled in the art, variations in the designed flow rate for the installed system can be effected, within a limited range, by varying the operating pressure of the low pressure irrigating fluid. The described system thus not only permits the continuous emission of irrigating fluid from each of the fluid dispensing units at a selected uniform rate, but also affords a controllable variation of the emission rate in accordance with the needs of a particular installation at a particular time.

As pointed out earlier, the desired continuity of operation of subterranean irrigation systems over extended periods of time has heretofore been detrimentally affected by the accumulation of sediment within the system and, in particular, by its deleterious accumulation in those portions of the system that control the rate of fluid emission.

The subject invention includes a method of periodically cleaning or purging fluid distributing units of the types described above in accordance with the volumetric flow and sediment content of the particular irrigating fluid being employed so as to minimize, if not present, the accumulation of sediment within the units and to thereby avoid the detrimental and often destructive effects of sediment accumulation that characterized prior efforts in this field.

In accordance with the principles of this invention, the plug elements in each of the fluid dispensing units 34 of either type described above are normally biased into firm seated engagement with the tapered plug receiving bores and the degree of such biasing force as effected by the preloaded spring members is such as to effectively maintain said plugs in such firm seated relationship in the bores throughout the normal operating low pressure range to which the system may be subjected, as described above. Referring again to FIG. 1, a flow meter 14, in the general form of a paddle wheel or impulse turbine 16, is included in the high pressure line and is adapted to be rotatably displaced in accordance with the rate of fluid flow therepast and hence to be cumulatively displaced in accord with the volumetric flow. Such flow meter 14 is mechanically or electrically linked to a control unit 70, as indicated by the dotted line 72 so as to effect periodic actuation of the latter in response to the passage of predetermined amounts of irrigating fluid through the high pressure line. Each such actuation of the control unit 70 serves to open or bypass the pressure reducing valve assembly 18 for a predetermined period of time and to thereby subject all of the system disposed downstream thereof to a high pressure surge or pulse of the irrigating fluid at a pressure substantially equal to that extant in the high pressure line 10. Such high pressure fluid should have a pressure that is at least twice and preferably three or more times the normal or low operating pressure of the system. If for some reason the operating "high pressure" source of irrigating fluid is not of sufficient magnitude or in fact is non-existent, a separate source of high pressure fluid connectable into the system may be employed. Said high pressure surge or pulse should be of sufficient magnitude to lift each of the plug elements out of seated engagement in their respective tapered bores and to maintain the same in limited elevated or open position to thereby permit the passage of irrigating water, in minimal amount but under greatly increased flow rates approaching, if not attaining turbulent flow condition, through said tapered bores and entirely around the plug surfaces into the fluid reservoir chambers and out through the porous discs. The marked increase in flow rate through the now enlarged metering channels, will serve to entrain any sediment as may have accumulated therein or in other parts of the fluid dispensing units since the last cleaning cycle and carry the same out through the porous discs.

The control unit 70 employed should be such as to be readily pre-settable in accordance with the volumetric flow in the system and the sediment loading characteristics of the particular water employed. For example, with irrigating water containing a relatively high degree of sediment, the system should be repetitively subjected to a pressure surge cleaning cycle at predetermined time intervals, for example, about once every ½ hour, if not more frequently, and such cycle should include subjecttion of the system to a high pressure surge of predetermined duration, as, for example, for as long as about 30 or so seconds in duration. In contradistinction therewith, when municipal or other water containing little or no sediment is employed, the system may need to be only subjected to a pressure surge cleaning cycle once every so many hours, for example, once every 12 or 24 hours. It should be noted, from a design standpoint, that the amount of water periodically introduced into the soil as a result of the pressure surge cleaning cycle should be taken into consideration in selecting a normal or desired flow rate for each installed system. In any event, it will be apparent from the forgoing that the described system readily accommodates the utilization of the described method of subjecting the entire system to periodic high pressure cleaning surges at predetermined time intervals and for predetermined durations, selectable in accordance with the needs of a particular installation and character of irrigating fluid therein used and which serves to continually prevent the accumulation of sufficient sediment or other detrimental particulate matter to cause diminution of normal flow or otherwise deleterious effects impeding the flow of irrigating fluid into the soil.

FIG. 7 is intended to be illustrative of the construction, by way of example, of a suitable control unit 70 for effecting periodic actuation of the cleaning cycle and for controlling the duration of application of the high pressure surge or pulse. As there illustrated, an impulse turbine 16 disposed in the high pressure line 10 is connected by shaft 90 to an external disposed worm gear 92. The worm gear 92 drivingly engages a bevel gear 94 mounted on a first shaft 96. Connected intermediate the first shaft 96 and a second shaft 100 is a speed reducing unit, generally identified by the reference numeral 98, which serves to reduce the cumulated displacement of rotor 16 over a predetermined time period to a fraction of a revolution of shaft 100. A disc 102 having a plurality of axially disposed pins 104 peripherally mounted thereon is disposed at the end of the second shaft 100 and such is thus adapted to be rotated through a predetermined arc in response to a predetermined degree of cumulative rotative displacement of the rotor 16.

Disposed adjacent to the above-described gear train is an elongate rotatable control shaft 106. An extending pin 108 is radially disposed at one end thereof and said pin is sized to extend into the path of travel of the pins 104 and to be successively engaged and displaced thereby. Disposed remote from the pin 108 is a roll cam 110, suitably formed of a spur gear having a segment 112 removed from the periphery thereof and positioned to be drivingly engaged by spur gear 114 mounted on and rotating in conjunction with the aforesaid first shaft 96. A suitably contoured control cam 120 is mounted at the terminal end of the shaft 106 and will be rotated in conjunction therewith. As will now be apparent, a preselectable degree of accumulated rotative displacement of the rotor 16 in response to fluid flow in the high pressure line 10 will be translated through the aforesaid gear train into a greatly reduced but predetermined degree of arcuate displacement of the disc 102 and pins 104 mounted thereon. Such displacement of the pins 104 will periodically initiate displacement of the shaft 106 through the pin 108. Such initiated displacement rotatively displaces the roll cam 110 into driving engagement with the relatively high speed spur gear 114 and such will effect substantially one revolution of the shaft 106 at a relatively high, but readily preselectable speed. Such displacement of the shaft 106 will serve to effectively relocate the pin 108 for subsequent engagement thereof by the next succeeding pin 104 to automatically effect disengagement of the roll cam 110 from the spur gear 114 and to also displace the cam 120 through one revolution in a predetermined time interval.

The cam 120 serves to control the positional displacement of a cam follower shaft 122 whose other end terminates in a valve closure member normally seated in valve closing relationship with a port 124 in the high pressure line. The port 124 is located within a chamber formed by housing 126 and a biasing diaphragm 128 secured to the end of the cam follower 122. The chamber so defined is disposed in fluid communication with the interior of the housing 136 for the pressure regulator 18 via conduit 130. The fluid from the high pressure line 10 is normally introduced into the upper portion of the flow regulator 18 through a port whose effective size is controlled by the position of a valve closure member 140. The valve closure member 140 is mounted on an arm 142 which in turn is supported by a flexible diaphragm 144 normally biased by a spring 146 and associated adjusting mechanism 148. As is apparent, the conduit 130 communicates with the lower portion of the housing 136 below the diaphragm 144, with such portions being vented through a small opening 138.

In operation of the subject unit, the port 124 will normally be maintained in a closed position and the high pressure line 10 will be connected to the low pressure line 22 solely through the pressure regulator valve assembly 18. In response to the normal flow through the high pressure line 10, the rotor 16 will be continuously displaced and the accumulated displacement thereof in preselected amounts will be reflected in rotation of the disc 102 and in periodic initiation of displacement of the shaft 106 and the concomitant periodic rotation of the cam 120 through one revolution in a predetermined time. The initial displacement of the cam 120 during each revolution will effect a rapid opening of the port 124, thus permitting high pressure fluid to flow into chamber 126 and through the conduit 130 into the lower portion of the housing 136 of the pressure regulator valve. Because of the relatively small size of the venting apertures 138, the introduction of the high pressure fluid into the lower portion of the pressure-regulating valve assembly will result in an upward displacement of the diaphragm 144 and valve port closure member 140 to thus increase the size of the port and permit the direct application of the high pressure fluid to the low pressure output line 22 through the upper chamber of the pressure regulator. Such condition will be maintained until the roll cam 120 is displaced through a predetermined degree of arcuate displacement at which time the valve port 124 is closed and the application of the high pressure fluid via the conduit 130 to the underside of the diaphragm 144 is cut off. Such pressure relief permits the diaphragm 144 and spring 146 to reassume control and to reduce the pressure in the output line 22 to its normal low pressure value and the system will thus be reset for the next actuation thereof.

Experience to date has indicated that fluid dispensing units of the types heretofore described while satisfactory for relatively small installations, are not preferred for large scale installations because of the inconvenience of accommodation of variations in the static head of the irrigating fluid resulting from local topographical features at the situs of use and the need for large diameter headers to accommodate the relatively massive fluid flows required for effective pressure pulse cleaning techniques when extremely large numbers of fluid dispensing units are connected to a single source of fluid.

Figure 13:
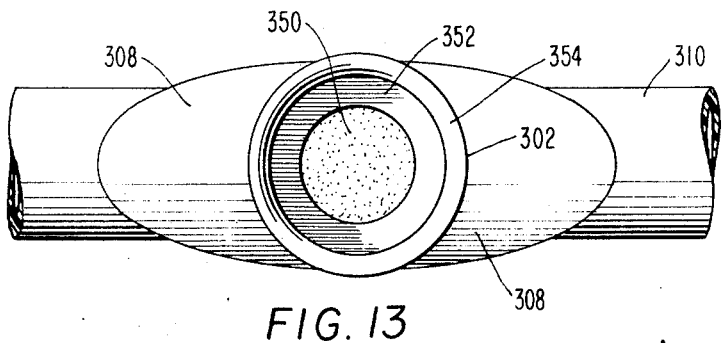
FIG. 13 is a plan view of the unit illustrated in FIG. 12.
Figure 12:
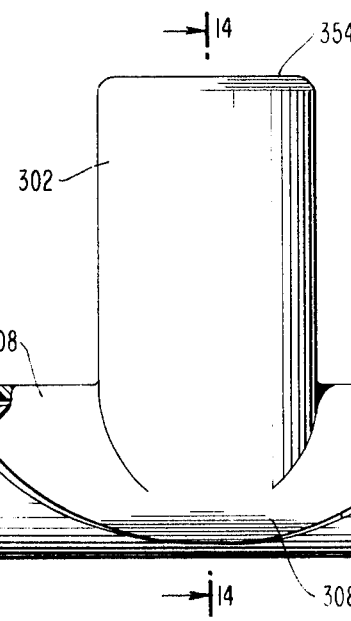
FIG. 12 is a side elevational view of alternate constructions for fluid dispensing units incorporating the principles of this invention.
Figure 14:
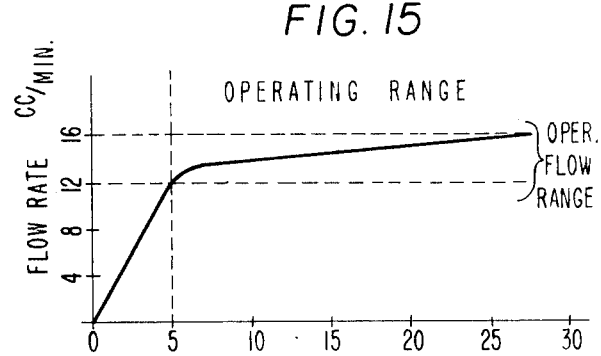
FIG. 14 is a vertical section as taken on the line 14—14 of FIG. 12.

FIGS. 12, 13 and 14 illustrate a presently preferred construction for fluid dispensing units 34 that is particularly adapted for use in larger scale installations such as farms, orchards and the like that employ relatively large numbers of fluid dispensing units connected to a single water distribution system.

As best shown in FIG. 14 the preferred construction suitably comprises a generally cylindrically shaped molded housing 302 selectively contoured to form an upwardly open cylindrical fluid reservoir or chamber 304. The lower portion of the housing 302 is again of a preferably saddle-shaped configuration 308 sized to be mounted in fluid tight relation on a fluid carrying conduit member 310 in such manner as to provide a sediment trap area 306 of appreciable capacity disposed well below the fluid delivery aperture 312 in the conduit.

The intermediate portion of the housing 302 is provided with a raised edge internally disposed shoulder 322 defining an enlarged bore 320. The sharp raised edge of the shoulder 322 serves to peripherally support and retain a flexibly displaceable diaphragm member 324 having a centrally disposed circular fluid passage aperture 326 therein and a peripheral retaining ring 325 that extends both above and below the flat diaphragm surfaces. Disposed within the bore 320 and positioned immediately above the diaphragm 324 is a valve plug member generally designated 330. The underside of the valve plug member 330 is selectively contoured, as illustrated at 332, to provide a peripheral dependent locking and sealing ring portion 334 adapted to compressively engage the upper surface of the diaphragm member 324 and, in combination with the raised edge shoulder 322, to securely locate and position the periphery thereof and with the retaining ring 325 disposed externally of the point of juncture thereof; an essentially annular shaped recessed chamber disposed within the locking ring portion 334 and above the flexible diaphragm 324 and surrounding an axially located depending projecting portion 328 disposed in flow impeding proximity within and extending through the fluid passage aperture 326 and cooperatively defining a fluid flow channel 327 in the form of an annular or variable cross-sectional area.

The undersurface of the valve plug member 330 adjacent to the locking ring portion 334 thereof is of a slightly dome-shaped configuration of moderate curvature and is specifically shaped so as to support and thereby physically prevent the diaphragm 324 from being deformed beyond a predetermined maximum stress limit. Such maximum stress limit will be determined in part by the material utilized for the diaphragm which should be selected to have minimal creep characteristics and a high fatigue endurance limit. As mentioned above, the undersurface of the valve plug member 330 adjacent to the depending projecting portion 328 is selectively contoured so as to be of progressively varying cross-sectional area and to cooperatively define, with said aperture 326 in the diaphragm 324, a metering annulus 327 of varying effective cross-sectional area in accord with the positional disposition of the diaphragm member 324 relative thereto as the latter is located by the action of water pressure extant in the reservoir 304.

Figure 15:
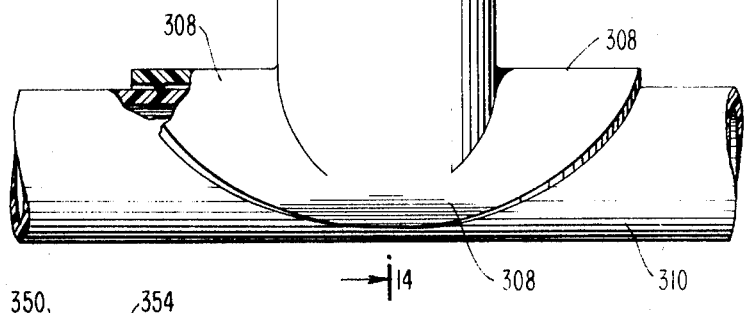
FIG. 15 is a schematic graphical representation of a desirable type relation between supply pressure and flow rate for the type of unit illustrated in FIGS. 12–14.

The depending projecting portion 328 is generally of a modified conical configuration that terminates in a dependent point-like extremity that extends slightly beyond the undersurface of the diaphragm 324. The surface of the projecting portion 328 is selectively contoured, in relation to the varying shape and size of the fluid passage aperture 326 as the latter is displaced in response to fluid pressure variations, so as to complementally effect a relatively small first progressive decrease in the area of the annular flow channel 327 in response to a first fluid pressure increase from zero to a first predetermined value to effect a progressive increase in fluid flow therethrough in proportion to the increase in pressure and a relatively large second progressive decrease in the area of the annular flow channel 327 in response to further pressure increase above said first predetermined value to effectively maintain the flow therethrough substantially constant throughout said increased pressure range. As shown in FIG. 15 by way of example, the parts may be suitably contoured to provide for an increase in flow rate from zero to about 12 cc./mm. for a pressure increase from zero to about 5 p.s.i.g. and to thereafter maintain the flow rate substantially constant as the water pressure varies from 5 up to 30 p.s.i.g. as would a range of values suitable for normal operation. The above described selective contouring will thus provide for a substantially constant rate of fluid feed independent of variations in pressure above a preselected minimum value thereof and thus inherently accommodate variations in fluid pressure introduced by variations in static head occasioned by local topography and frictional looses in the supply piping and the like.

The upper surface of the valve plug 330 is shaped to provide a peripherally disposed upwardly projecting sharp edged shoulder 338 defining a centrally located second fluid reservoir or sediment trapping chamber 340 that is disposed in fluid communication with the annular recessed chamber on the underside thereof through an enlarged passage 336 disposed adjacent to the projection 328 therein. Positioned above the valve plug member 330 and peripherally supported thereby in a semi-rigid porous disc 350 of the type and character heretofore described. The disc 350 is firmly secured in position by the use of a locking ring 352 with sharp dependent edges 356 and an overlying bead in the manner heretofore described in conjunction with the embodiments of FIG. 8 through 11.

In operation of the subject unit, the rate of fluid flow into the second reservoir 340 and through the device will be controlled by the effective cross-sectional area of the metering annulus 327 as cooperatively defined by the location of the defining edges of the aperture 326 in the diaphragm member 324 relative to the projecting portion 328 of the underside of the valve plug member 330.

As will be apparent from the foregoing and as depicted in FIG. 15, the displacement of the diaphragm in response to supply pressure variations will tend to minimize, if not avoid, sediment accumulation in or around the metering annulus 327. The flow channel areas remote therefrom do not critically effect the fluid flow characteristics and can be readily sized to accommodate whatever amounts of sediment accumulation that are expected to occur over the projected operating life of the system. It should also be noted that, with the described unit, reduction in water pressure to zero as by closure of the supply thereof will permit complete relaxation of the diaphragm 324 and return thereof to its rest position with a concomitant marked enlargement of the effective metering annulus 327. Under such circumstances, the countercurrent draining of irrigating fluid will cause sediment which may have accumulated in the metering annulus 327 to settle within the trap portions 306 of the chamber 304.

As will now be apparent from the foregoing, the construction of fluid dispensing units illustrated in FIGS. 12–14 readily accommodates the necessary design variations required to secure predetermined optimum flow rates in accord with the dictates of the locus of installation and are particularly advantageous in that they automatically compensate for differences in static head as occasioned by topographic variations in terrain and other factors and are substantially unsusceptible to clogging resulting from sediment accumulation. In large scale installations wherein variation in static head due to topography and frictional loss will usually be inherently present, the units of the type herein above described will thus readily permit the dispensing of substantially uniform metered amounts of irrigating fluid over the entire area to be irrigated and which will additionally provide a highly effective degree of cleaning or sediment purging by merely interrupting the flow of irrigating fluid for selected periods of time.

It will be appreciated by those skilled in this art that the embodiments shown and described herein are intended to exemplify the principles of the invention and that modifications may be made in the various structures, features, arrangements and modes of operation of the illustrated apparatus without departing from the scope or the spirit of the invention.

Having thus described our invention, we claim:

1. An underground liquid dispensing unit for connection to liquid conveying conduit means in subterranean irrigation systems comprising
   housing means defining a liquid reservoir and a liquid inlet thereto,
   porous barrier means disposed in liquid communication with said reservoir and forming a liquid egress therefrom,
   valve means including a moveable member positionally responsive to the pressure of liquid in said liquid conveying conduit means for controlling the rate of liquid admission into said reservoir in accord with the magnitude thereof.

2. A liquid dispensing unit as set forth in claim 1 wherein said valve means includes a moveable member normally biased in flow restricting position to limit the admission of liquid into said reservoir to preselected predetermined amounts and biasing means for said moveable member responsive to an increase in the pressure of liquid in the liquid conveying conduit means above a predetermined value thereof to permit displacement of said moveable member from its flow restricting position to a location remote therefrom.

3. A liquid dispensing unit as set forth in claim 1 wherein said valve means includes valve seat means of conically tapered configuration, a complementally shaped plug member normally biased into seated engagement with said valve seat means and cooperatively defining therewith at least one normally open channel therethrough sized to control the rate of admission of irrigating liquid to said reservoir from said liquid conveying conduit means.

4. A liquid dispensing unit as set forth in claim 1 wherein said valve means includes a fixed member and a movable member cooperatively defining a liquid flow channel of varying effective cross-sectional area in accord with the positional disposition of said movable member relative to said fixed member.

5. A fluid dispensing unit for connection to fluid conveying conduit means in subterranean irrigation systems comprising
   housing means defining a fluid reservoir and a fluid inlet thereto,
   porous barrier means disposed in fluid communication with said reservoir and forming a fluid egress therefrom,
   valve means associated with the fluid inlet to said reservoir for controlling the rate of admission of fluid into said reservoir from said fluid conveying conduit means,
   said valve means including a displaceable diaphragm member having a fluid passage aperture therein,
   selectively contoured means of progressively varying cross sectional area disposed in flow metering proximity to the fluid passage aperture in said diaphragm,
   said selectively contoured means and diaphragm aperture cooperatively defining a metering channel of varying effective cross-sectional area in accord with the positional disposition of said diaphragm relative to said contoured means.

6. A fluid dispensing unit for connection to fluid conveying conduit means in subterranean irrigation systems comprising
   cylindrically shaped housing means having a base portion shaped to complementally overlie fluid conveying conduit means and securable thereto in fluid tight relation,
   a displaceable diaphragm member having a fluid passage aperture therein mounted within said housing and defining, with said base portion, a first fluid reservoir,
   a metering valve member having its undersurface selectively contoured to provide a projecting portion of progressively varying cross-sectional area disposed in flow metering proximity to the fluid passage aperture in said diaphragm member and cooperatively defining therewith a fluid flow metering channel of varying effective cross-sectional area in accord with the positional disposition of said displaceable diaphragm relative to said projecting portion of said valve member, and
   a porous barrier member disposed over said valve member and forming a fluid egress from said housing means.

7. A fluid dispensing unit as set forth in claim 6 wherein the upper surface of said metering valve member is contoured to provide a recess therein disposed in fluid communication with said fluid flow metering channel and which forms, in association with the overlying porous barrier member, a second fluid reservoir.

8. A fluid dispensing unit as set forth in claim 6 wherein the effective cross sectional area of said fluid flow metering channel varies inversely with the diaphragm displacement inducing fluid pressure present in said first fluid reservoir.

9. A fluid dispensing unit as set forth in claim 6 including sharp edged locking ring means compressively disposed intermediate said porous barrier means and the upper end of said housing means to prevent root hair penetration at the interfaces thereof.

10. An irrigation system for subterranean installation comprising
    an irrigating fluid header,
    a plurality of fluid dispensing units disposed underground,
    underground conduit means terminally connected to said header and connected to each of said fluid dispensing units for conveying irrigating fluid from said header thereto
    at least one of said fluid dispensing units having valve means incorporating a moveable member positionally responsive to the pressure of the irrigating fluid in said conduit means for controlling the rate of fluid transfer from said conduit means into the surrounding soil.

11. The system as set forth in claim 10 wherein said valve means maintains the rate of fluid emission substantially independent of the pressure of irrigating fluid in said conduit means.

12. The system as set forth in claim 10 including means for introducing soil conditioning additives to the irrigating fluid flowing in said conduit means.

13. The system as set forth in claim 10 wherein said movable member is normally biased in fluid flow limiting position and is displaceable therefrom in response to a change of predetermined magnitude in the pressure of fluid in said conduit means to disturb accumulated sediment in proximity thereto.

14. In the subterranean irrigation of soil wherein irrigating fluid is dispensed through a multiplicity of underground fluid dispensing units having a movable member therein the step of subjecting each of said fluid dispensing units to a change in the pressure of the irirgating fluid being dispensed therethrough to displace said movable members therein and disturb accumulated sediment in proximity thereto.

15. A liquid dispensing unit for connection to liquid conveyong conduit means in subterranean irrigation systems comprising housing means defining a liquid reservoir having a conically contoured dependent end and a fluid inlet disposed in fluid communication with the apex thereof, porous barrier means disposed in liquid communication with said reservoir and forming a liquid egress therefrom, valve means including a moveable conically shaped flexible plug element normally biased in flow restrictin relation within said conically contoured dependent end of said reservoir for controlling the rate of admission of liquid into said reservoir from said liquid conveying conduit means.

16. A liquid dispensing unit as set forth in claim 15 wherein said conically shaped flexible plug element includes an enlarged base portion adapted to be disposed in interfacial contact with the surface of said conically contoured dependent end of said reservoir whereby the apex portion of said plug element is disposed in predetermined spaced relation therewith.

17. A fluid dispensing unit as set forth in claim 6 including sharp edged locking ring means compressively disposed intermediate said porous barrier means and the upper end of said housing means to prevent root hair penetration at the interfaces thereof.

18. The system as set forth in claim 10 including flexible fluid conveying means disposed intermediate said header and the terminal ends of said conduit means for accommodating physical variations in position therebetween.

19. The system as set forth in claim 18 wherein said flexible fluid conveying means comprises convoluted flexible hose of effective diameter markedly larger than the diameter of said conduit means for maintaining relatively slow fluid flow rates therethrough.

References Cited

UNITED STATES PATENTS

| | | | |
|---|---|---|---|
| 780,986 | 1/1905 | Francis | 137—504 |
| 824,426 | 6/1906 | Johnson | 137—504 |
| 2,445,717 | 7/1948 | Richards | 61—13 X |
| 2,674,490 | 4/1954 | Richards | 61—13 X |
| 3,046,747 | 7/1962 | Timpe | 61—13 |
| 3,048,032 | 8/1962 | Winter | 47—48.5 X |
| 3,200,539 | 8/1965 | Kelly | 61—12 X |
| 3,308,798 | 3/1967 | Snider | 137—504 X |
| 3,419,038 | 12/1968 | Andresen | 137—504 |

JACOB SHAPIRO, Primary Examiner

U.S. Cl. X.R.

47—48.5; 111—7.3; 137—504; 239—534, 542